United States Patent Office 2,708,365
Patented May 17, 1955

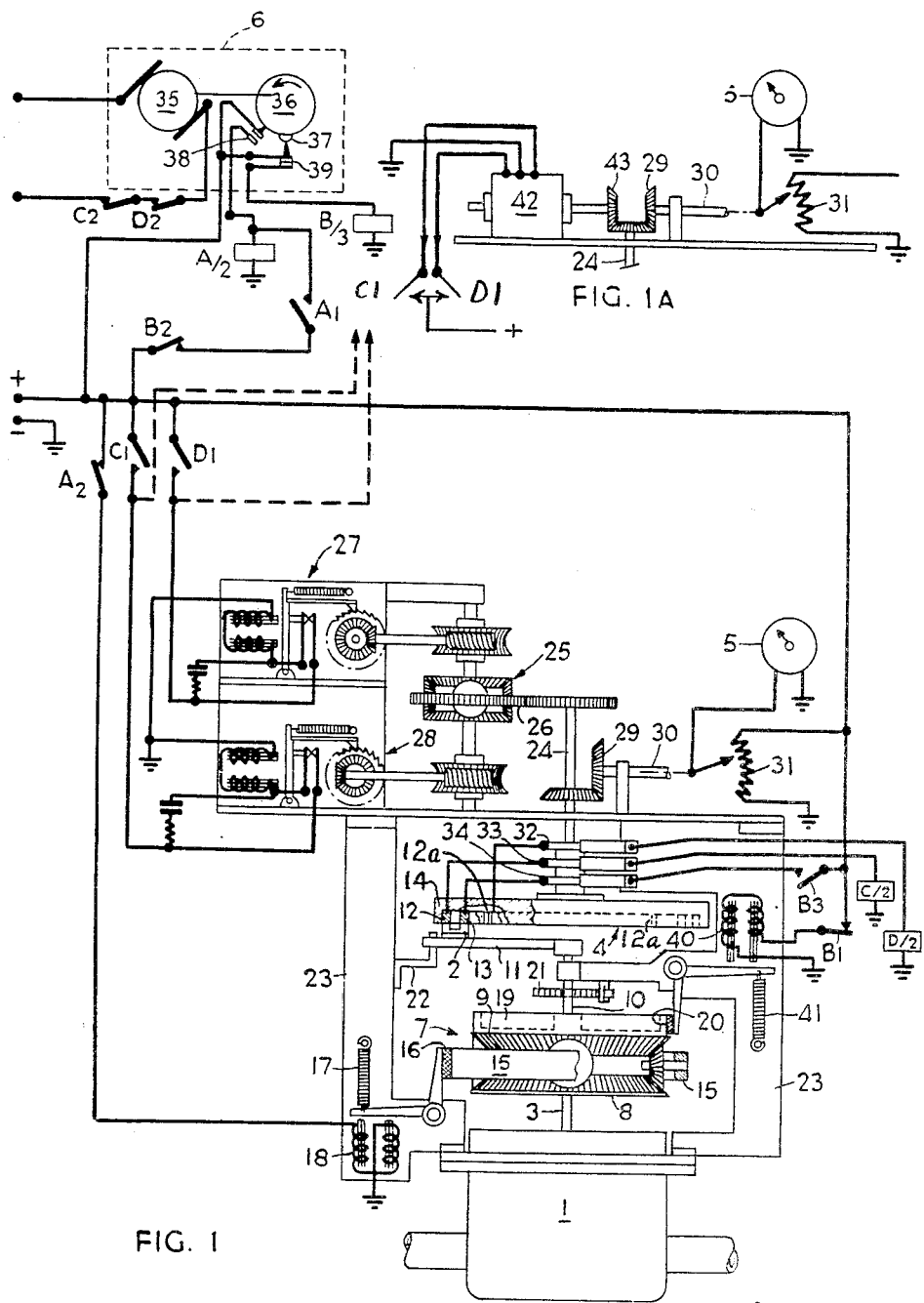

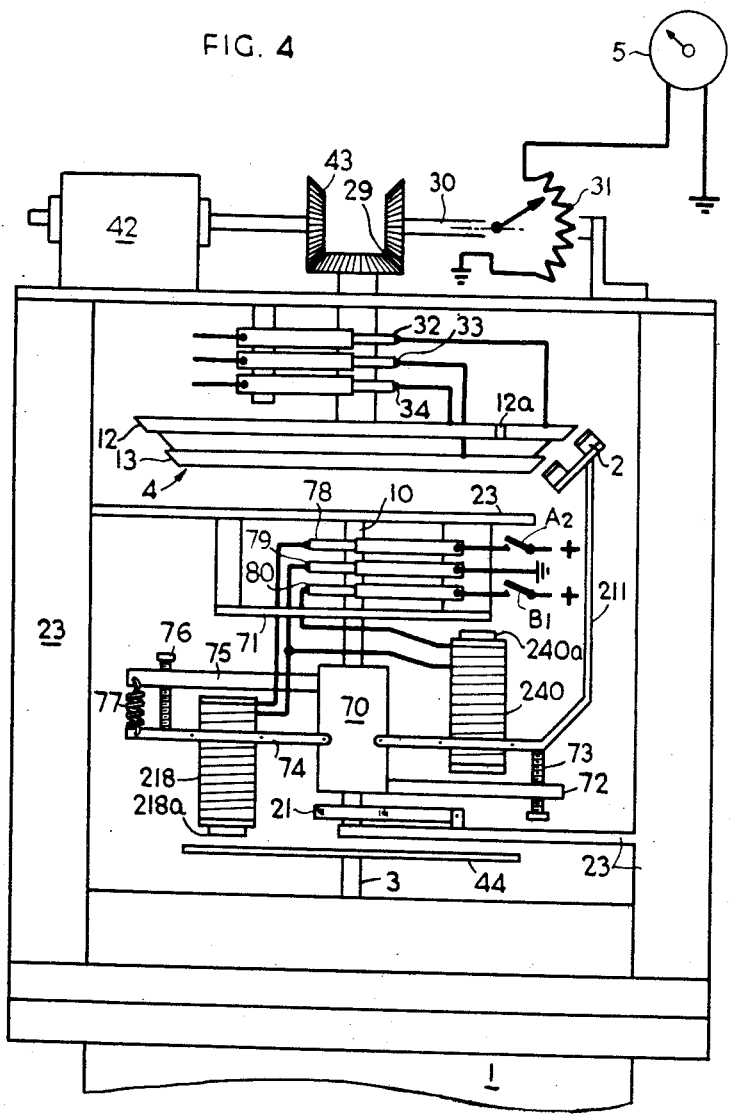

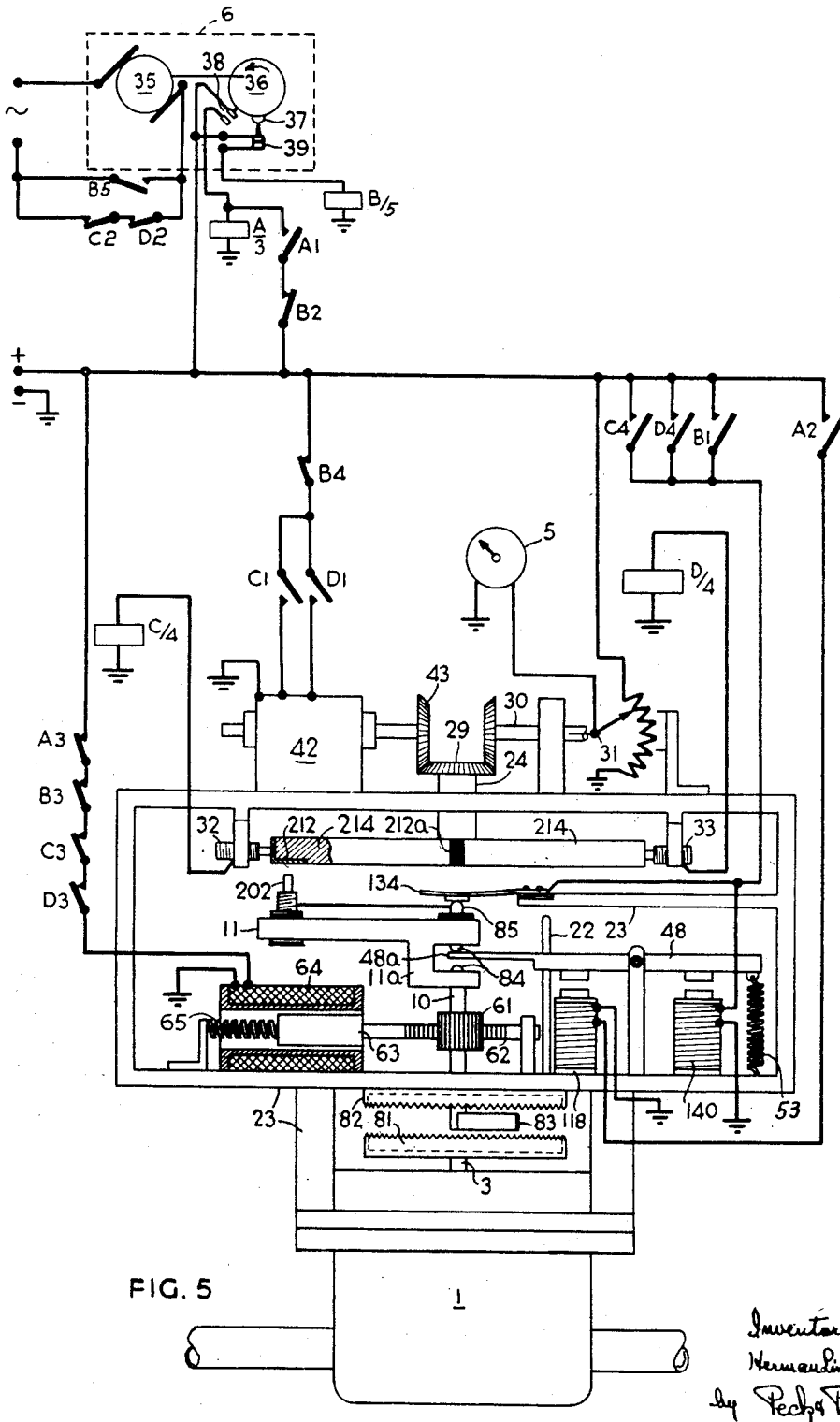

2,708,365

APPARATUS FOR MEASURING THE RATE OF FLOW OF A FLUID

Herman Lindars, Sheffield, England

Application January 23, 1950, Serial No. 140,119

Claims priority, application Great Britain January 24, 1949

10 Claims. (Cl. 73—194)

This invention concerns apparatus for measuring the rate of flow of a liquid or gaseous fluid, and relates to apparatus which is responsive to changes of rate of flow of fluids and which may be employed to indicate, measure or record such flow.

It is an object of the present invention to provide apparatus that will be efficient, robust, and sensitive in operation.

The most frequently used apparatus for measuring liquid or gaseous flow depends on the differential pressure set up across orifice plates or venturi tubes or the like placed in the ducting or piping carrying the fluid to be measured. Such apparatus has certain disadvantages in that it is not particularly accurate, especially at low rates of flow, or where variations in density are encountered, for example, due to fluctuations in temperature of the fluid. Moreover, since the volume of fluid passing the orifice plates or the venturi tube is proportional to the square root of the differential pressure, and since this latter must be kept to a low value unless relatively high resistance is to be set up to the flowing fluid, such apparatus is liable to be inaccurate at low rates of flow.

The present invention employs a known metering device which measures the volume (not not the flow) of fluids and which has a displaceable element, preferably a rotating spindle or shaft, operating the valve mechanism of the meter or its counter mechanism as the case may be, or which can be adapted so as to give a rotary movement which in turn will give an accurate indication of the volume of fluid which passes through the meter. Examples of such metering devices are the ordinary meter for measuring the volume (in, say, cubic feet) of town's gas supplied from the mains to the consumer, and the rotary displacement or other positive type meters, all of which measure the volume of liquid passing through a system of pipes.

It is an object of the invention to provide mechanism responsive to rate of flow of a fluid which shall have an accuracy comparable to the high degree of accuracy obtainable in volumetric flow meters.

Another object is the provision of mechanism which shall indicate or record low rates of flow with a degree of accuracy comparable with that attainable at high rates of flow.

A further object is the provision of rate of flow responsive mechanism wherein the load imposed on the volumetric metering element is substantially constant at all rates of flow and independent of the power absorbed by the indicating or recording apparatus.

Yet another object is to provide mechanism responsive to the rate of flow of a fluid which shall be capable of rugged construction without detriment to its accuracy.

Alternative constructions embodying the invention will now be described, by way of example only, with reference to the accompanying drawings in which:

Fig. 1 shows a complete schematic arrangement of a first embodiment of the invention;

Fig. 1A shows an alternative arrangement of followup drive;

Figs. 2, 3 and 4 show alternative embodiments, parts of the electrical circuiting being omitted;

Fig. 5 is a complete schematic arrangement of a still further alternative embodiment.

Throughout the drawings like parts carry similar reference numerals.

Figure 1B:
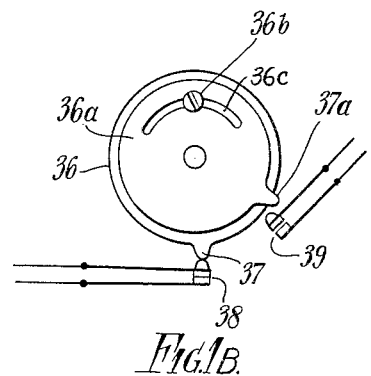
Fig. 1B shows a modification embodying means for adjusting the time interval between the operation of two sets of contacts.

In all embodiments, the apparatus for measuring the rate of flow of a fluid consists essentially of a volumetric flow meter 1 of the rotary type for measuring the quantity of fluid flowing in a given period, a movable master contact 2 which can be clutched to the output spindle 3 of the flow meter for specified intervals of time, a follow-up slave contact assembly 4 which is normally engaged by the movable master contact 2 and which is also movable so as to be capable of hunting for the position of the master contact 2, a rate of flow indicator 5 controlled by the follow-up slave assembly 4 and a timing device 6 for determining the instant at which the master moving contact 2 is clutched to the flow meter 1 and the duration of the period of drive thereby.

The principle of the apparatus is that the fluid flow meter 1 is continuously rotated so long as there is a flow of fluid in the circuit in which it is connected, and the master movable contact 2 is intermittently clutched to the output spindle 3 thereof for specified intervals of time, say, five seconds, under the control of the time device 6. At the end of each such period, the contact 2 is declutched from the flow meter and held in its new position whilst the follow-up slave contact assembly 4 is then rotated to hunt for the new position of the master contact 2 and in so doing controls the position of the rate of flow indicator 5. When this position has been found, the follow-up slave contact breaks the circuit to the master movable contact 2 and the latter reverts to a zero position, and the cycle of operations is repeated. It will thus be seen that the apparatus operates in effect to measure the quantity of fluid flowing in each successive fixed time interval, and since the successive time intervals are relatively brief and of the same duration, the extent of travel of the master movable contact 2 during the fixed time intervals is proportional to the rate of flow of the fluid. Thus, the indicator 5 can be directly calibrated in rate of flow.

In the specific construction of apparatus shown in Fig. 1, the spindle 3 of the flow meter 1 is connected to the one sun wheel 8 of a differential gear 7 the other sun wheel 9 of which is mounted on a shaft 10 to which is keyed a radial arm 11 carrying at its extremity a master contact 2 of a size to bridge a pair of concentric annular follow-up slave contacts 12, 13 mounted on a disc 14 co-axially with the shaft 10, the parts 12, 13, 14 constituting the slave assembly 4. The planet carrier 15 of the differential gear 7 is engageable by a friction brake 16 which is normally held on by means of a spring 17 and is releasable by the action of an electromagnet 18. The sun wheel 9 is also provided with a brake rim 19 which is engageable by a similarly arranged friction brake 20. The shaft 10 of this sun wheel is also biased by means of a spiral spring 21 to hold the radial contact arm 11 against a fixed stop 22 mounted on the framework 23 of the mechanism.

The disc 14 of the follow-up slave contact assembly 4 is mounted on a shaft 24 which is driven from the planet carrier 26 of another differential gear 25 by one or other of a pair of one-way electromagnetic vibration motors 27, 28, and to this shaft is also geared (at 29) the spindle 30 of a rotary potentiometer 31 across which is connected a voltmeter 5 calibrated in terms of rate of flow. The annular follow-up contact 12 is interrupted at two diametrically opposite points 12a, and each half is connected to a respective slipring 32, 33 on the shaft 24 whilst the other and continuous follow-up contact 13 is connected to a third slipring 34.

The sliprings 33, 32 connected to the two parts of the interrupted follow-up contact 12 are connected in circuit with respective relays C/2, D/2 whose contacts $C_1$, $D_1$, respectively energise a corresponding one of the electromagnetic vibration motors. The slipring 34 connected to the continuous annular follow-up contact 13 is connected to one pole of the supply mains through relay contacts $B_3$.

A synchronous electric motor 35 or other timing mechanism drives a cam disc 36 having a single cam projection 37 which operates two sets of contacts 38, 39 respectively at different instants during each complete revolution. The first set of contacts 38 operates a relay A/2 which causes contacts $A_2$ to open, and the electromagnet 18 to be de-energised and the planet carrier brake 16 of the differential gear 7 to be applied. The relay A/2 is held in by hold-on contacts $A_1$ and normally closed contacts $B_2$. The second pair of contacts 39 operates a relay B/3 whose one pair of contacts $B_1$ are normally closed and are in the circuit to the magnet 40 which controls the brake 20 on the second sun wheel 9 of this differential. The relay B/3 also controls normally closed contacts $B_2$ and $B_1$ and normally open contacts $B_3$. Energisation of this relay B/3 thus de-energises the magnet 40 so that the brake 20 is applied to the sun wheel 9 and, at the same time, the hold on circuit of the relay A/2 is broken. The relay is arranged so that the contacts $B_1$ operate before the contacts $B_2$ and $B_3$.

When the circuit of the apparatus is first energised, and assuming that the timing device 6 is not in a position in which either pair of contacts 38 or 39 is closed by the cam 37, the magnets 18 and 40 are energised to release the brakes 16 and 20. The arm 11 is held against the stop 22 by the spring 21 so that the planet carrier 15 idles when the meter 1 is driven. The synchronous motor 35 drives the cam disc 36, and the following cycle of operations takes place:

The contacts 38 are closed and energise the relay A/2 which is held in by the contacts $A_1$ and $B_2$. At the same time, the contacts $A_2$ are opened to release the magnet 18 and allow the spring 17 to apply the brake 16 to the planet carrier. The arm 11 is now driven, against the bias of the spring 21, by the sun wheel 9 until the cam 37 closes the contacts 39 to energise the relay B/3. This opens the contacts $B_1$ and allows the brake 20 to be applied to the sun wheel 9 and releases the relay A/2. The arm is thus locked in the position to which it was moved by the meter whilst the planet carrier brake 16 is pulled off by the magnet 18 which now becomes re-energised through the normally closed contacts $A_2$ of relay A/2.

Simultaneously, the contacts $B_3$ are closed to connect the positive main to the slipring 34 and thence to the continuous annular contact 13 and via the bridging master contact 2, one or other half of the interrupted annular slave contact 12, and the corresponding slipring 32 or 33 to the appropriate relay C/2 or D/2. Energization of either of these relays, which is dependent on the portion of the interrputed annular contact 12 with which the bridging contact 2 happens to be engaged, closes the appropriate pair of contacts $C_1$ or $D_1$ and opens the corresponding pair of contacts $C_2$, $D_2$. The contacts $C_1$, $D_1$ energise the respective follow-up motors 27, 28 so that the follow-up slave contact assembly 4 is rotated in the same direction as the arm 11 until the circuit to the relay C/2 or D/2 is broken by the bringing into coincidence of the break in the interrupted annular slave contact 12 and the bridging master contact 2. Simultaneously, the appropriate contacts $C_2$ or $D_2$ have been opened to stop the synchronous motor 35 of the timing device 6, and hence re-closing of the contacts 38 is prevented. Rotation of the assembly 4 varies the setting of the potentiometer 31 and hence the reading of the instrument 5.

Figure 1C:
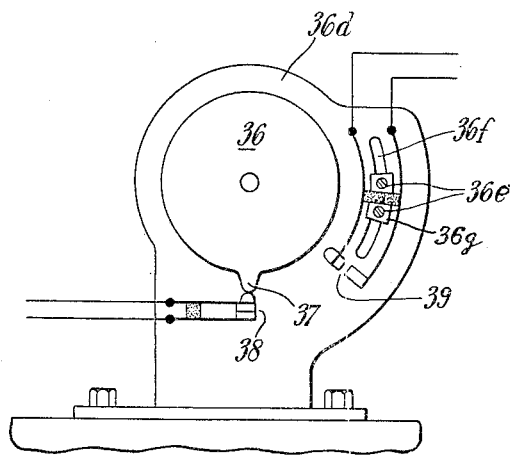
Fig. 1C shows a further modification embodying means for effecting the adjustment shown in Fig. 1B.

As soon as the relay C/2 or D/2 is de-energised, the follow-up motors 27, 28 are stopped and the timing device 6 is restarted. When the contacts 39 open due to the further rotation of cam 36, relay B/3 is released and the magnet 40 is re-energised through normally closed contacts $B_1$, thus removing the brake 20 from sun wheel 9. The latter is now free to move, since the planet carrier 15 is also free, and returns the arm 11 to the zero stop 22 under the action of the return spring 21 and the cycle is then complete. Re-energisation of the relay A/2 through the contacts 38 then re-commences the cycle, and it will be apparent that, provided the interval between closure of the contacts 38 and of the contacts 39 is suitably chosen, the apparatus will rapidly settle down to a state in which very little rotation of the follow-up slave contact assembly 4 is required in each cycle of events so that the indicator 5 follows closely the flow through the meter 1. The predetermined period between the operation of these two sets of contacts 38, 39 by the cam disc 36 is preferably rendered adjustable within small limits, for example, by the provision of a second cam disc 36a adjustably attached to the disc 36 by screw 36b passing through a slot 36c and carrying a projection 37a which operates the contacts 39 only (Fig. 1B). Alternately the same adjustment may be effected by adjustably mounting the contacts 39 relative to a fixed plate 36d by mounting the contacts on a block 36g which is slidably mounted in a slot 36f in the plate 36d, the block being maintained in adjusted position by means of screws 36e which pass through the block and the slot (Fig. 1C).

In the alternative arrangement of follow-up drive illustrated in Fig. 1A, the vibration motors 27, 28 are replaced by a reversible rotary machine 42 which drives directly on to the shaft 24 through a bevel gear 43. The direction of rotation of the motor 42 is determined, as before, by the relays C/2, D/2 through the contacts $C_1$, $D_1$ as shown by the dotted line connections.

Figure 2:
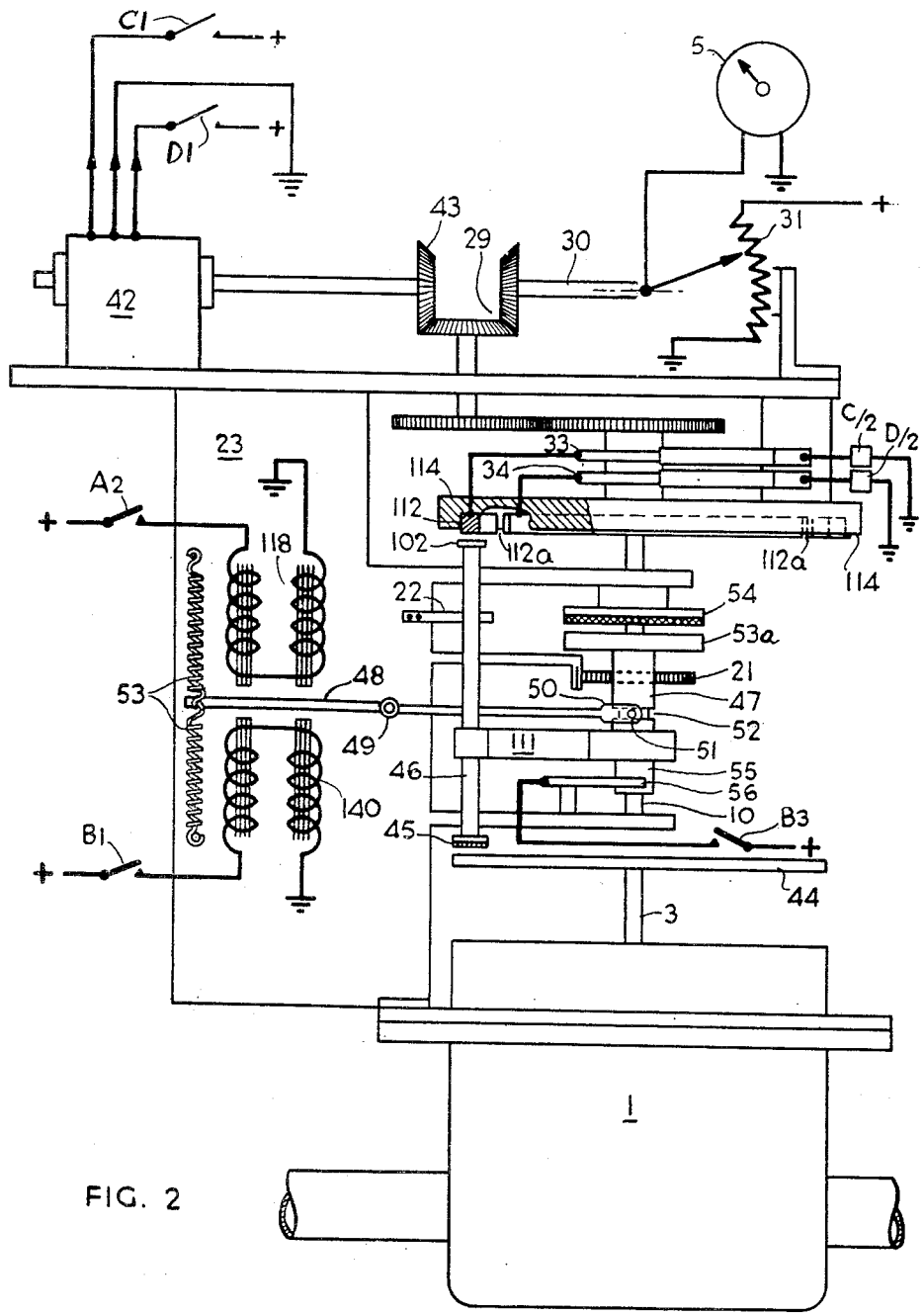

In another form of apparatus shown in Fig. 2, the flow meter 1 drives a friction disc 44 with which is engageable a friction pad 45 carried on one end of a pillar 46 at the other end of which is mounted a moving master contact 102. The pillar 46 is secured in the end of a radial arm 111 which is fixed on a sleeve 47. The latter is both rotatable and axially slidable on a spindle 10 which is mounted co-axially with the output shaft 3 of the flowmeter 1. The axial position of adjustment of this sleeve 47 is controlled by oppositely acting electromagnets 118, 140 energised by a timing mechanism (not shown) similar to that shown at 6 in Fig. 1. The electromagnets 118, 140 have a common armature 48 pivoted to the frame 23 at 49, and this armature is extended to terminate in a fork 50 embracing the sleeve 47 and carrying diametrically opposed pins 51 which engage in a groove 52 around the sleeve 47. Springs 53 serve to hold the armature 48 in its mid-position. The sleeve 47 is biased by a spiral spring 21 so as normally to hold the pillar 46 against a fixed stop 22 on the frame 23 of the mechanism. The moving master contact 102 is movable into engagement with an annular follow-up slave contact 112 interrupted at diametrically opposite points 112a, and carried on a disc 114 driven by a follow-up motor 42, the arrangement being essentially similar to the follow-up slave contact assembly 4 in Fig. 1A. The sleeve 47 carries one member 53a of a friction brake, the other member 54 of which is fixed to the frame 23, the two members being held in contact when the pillar 46 is raised.

The electrical circuit of the apparatus shown in Fig. 2 is the same as that shown in Fig. 1 except for the modifications now to be indicated. These arise from the fact that the electromagnets 118 and 140 are energised to perform the same functions as are performed by the magnets 18 and 40 when the latter are de-energised, and partly to the use of only one follow-up annular slave contact 112 in place of the two such contacts 12 and 13. The modifications, which are the only parts of the circuiting illustrated in Fig. 2 other than the circuit of the indicator 5, are as follows:

The winding of the electromagnet 118 is connected to the positive main through contacts $A_2$ which are normally open, whilst the winding of the electromagnet 140 is connected to the positive main through contacts $B_1$ which are normally open. Both these sets of contacts are normally closed in Fig. 1. The continuous annular contact 13 of Fig. 1 is replaced by a conducting sleeve or bush 55 which is electrically connected to the pillar 46 and is engaged by a spring contact 56 which is connected to the positive main through the normally open contacts $B_3$. The arm 111 is electrically insulated from the rest of the apparatus.

In operation of this arrangement, the radial arm 111 is first axially displaced downwards at the commencement of the fixed time period, as determined by the timing mechanism, by energisation of the electromagnet 118 through the normally open contacts $A_2$. In this position the friction pad 45 at the lower end of the pillar 46 engages the friction disc 44 driven by the flowmeter 1. The arm 111 is thus carried round through an angle corresponding to the quantity of fluid flowing through the flowmeter during the fixed period of time. At the end of this period, the contacts 39 of the timing device are closed, to energise the relay B/3, and contacts $B_1$ are closed. At the same time relay A/2 is de-energised and by it the magnet 118 is released. Simultaneously, the electromagnet 140 is energised to move the pillar 46 to its upper extreme position of axial displacement in which the master contact 102 is brought into engagement with the annular slave follow-up contact 112. At the same time, the friction brake 53a, 54 is engaged to prevent rotation of the sleeve 47 under the action of its return spring 21. The pillar 46 is thus held in the position to which it was moved by the flowmeter 1. The follow-up mechanism 42 is then energised through the contacts $C_1$ or $D_1$ by the circuit $B_3$, 56, 55, 46, 102, 112 and slipring 33 or 34 to relay C/2 or D/2 as the case may be. The mechanism runs until one of the gaps 112a in the annular slave follow-up contact 112 is brought opposite the master contact 102, whereupon the relay C/2 or D/2 is de-energised so as to interrupt the circuit to the follow-up mechanism. The potentiometer 31 geared to the follow-up mechanism at 29 is thus set to a position corresponding to the position of the radial arm 111 at the end of the predetermined period of time, and the mean rate of flow through the meter 1 is indicated by the voltmeter 5 as in Fig. 1. The circuit is then re-set and the sequence of operations is repeated.

Figure 3:
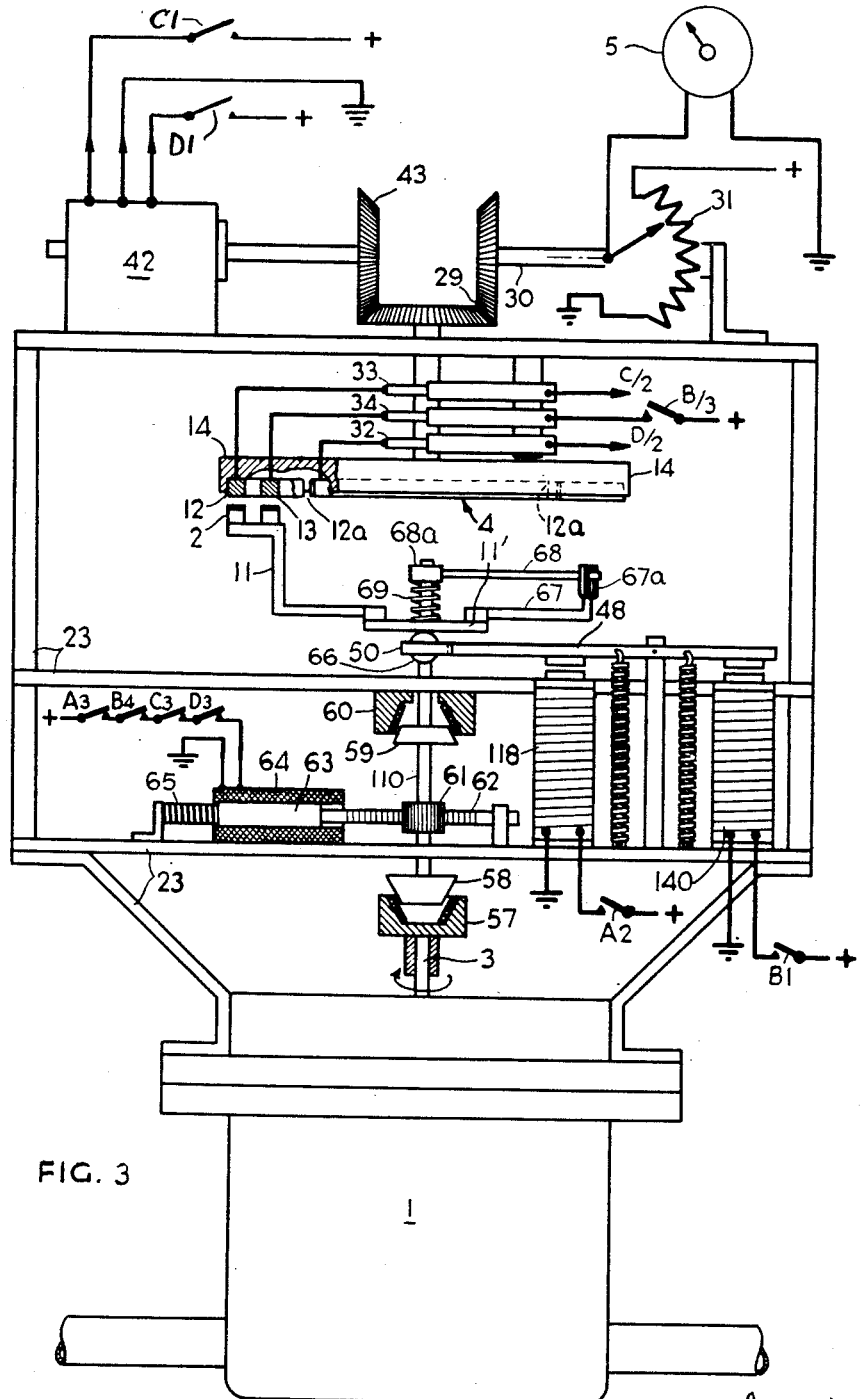

In the construction of apparatus shown in Fig. 3, the flowmeter spindle 3 carries at its free upper end the one half 57 of a small cone clutch, the other half 58 of which is mounted on the foot of a coaxial rotatable spindle 110 which has limited freedom of axial movement in bearings in the frame 23 of the apparatus. The upper end of the rotatable spindle carries a radial arm 11 at the end of which is mounted a master bridging contact 2 which is simultaneously engageable with a pair of annular slave contacts 12, 13, the former of which is interrupted at two diametrically opposite points 12a. These annular contacts 12, 13 are connected, in a similar manner to that shown in Fig. 1, to control a follow-up mechanism 42 as shown in Fig. 1A. Adjacent the radial arm 11 the rotatable spindle 110 also carries the male member 59 of an upper cone clutch assembly, the female member 60 of which is mounted on a frame part of the apparatus. The rotatable spindle 110 is normally held in an intermediate position, in which neither clutch is engaged, by a fork 50 which is carried on an extension of a common armature 48 for two oppositely acting electromagnets 118, 140, the former of which is energised to couple the spindle 110 for the predetermined period to the flowmeter 1 whilst the latter is energised to lock the spindle 110 at the end of the predetermined period in the position to which it has been moved by the meter 1 until the follow-up slave contact assembly 4 has reached the corresponding position.

The arm 11 is formed with a flat disc-like portion 11' which is slidably mounted on the spindle 110, this disc portion resting on anti-friction rollers 66 mounted on the limbs of the fork 50. At a point on the disc portion 11' which is diametrically opposite the arm 11 is rigidly secured a tail piece 67 which terminates in an elongated upwardly directed fork formation 67a between the limbs of which is passed the free end of a radial driving arm 68. This arm is secured to the upper end of the spindle 110 by a boss 68a, and a helical compression spring 69 is located around the spindle 110 between the boss 68a and the disc portion 11'. Thus, when the magnet 140 is energised to lift the fork 50, the spring 69 transmits the upward thrust to the spindle 110 and causes engagement of the clutch 59, 60. This is arranged to occur before the end of the travel of the fork 50 and before the contact 2 engages the annular follow-up contacts 12, 13. Continued travel of the fork 50 then compresses the spring 69 until the said contacts engage. In this way correct engagement of both the clutch and the contacts is ensured. It will be understood that the vertical length of the forked end 67a of the tail piece 67 is such that, for all relative displacements of the arm 11 and spindle 110, the driving arm 68 remains in engagement with the said forked end 67a.

The rotatable spindle 110 also carries an elongated pinion 61 which is engageable with a horizontal rack 62 mounted on the end of a solenoid plunger 63. The solenoid 64 is energised to return the rotatable spindle 110 to its zero position between successive cycles of operation of the electromagnets 118 and 140, a biasing spring 65 being attached to the solenoid plunger 63 to overcome the frictional drag thereof while the spindle 110 is being rotated by the flowmeter 1. Each of the relays A, B, C and D has an extra pair of contacts $A_3$, $B_4$, $C_3$, $D_3$ respectively associated therewith, these contacts being normally closed and connected in series between the positive main and the winding of the solenoid 64 so that the latter can only be energised when all the relays are de-energised. This condition only exists after the master contact 2 has reached the gap 12a in the slave contact 12, and the cam projection 37 is travelling from the contacts 39 to the contacts 38. The cycle of operation thus terminates with the return of the contact 2 to a zero position. The operation of this form of apparatus will be understood without further description.

In the apparatus shown in Fig. 4, which is designed primarily for use where a robust construction is required, the master bridging contact 2 is carried on a pivoted arm 211 whose lower end is pivoted on a bush 70 secured to the spindle 10. Adjacent its pivot, the arm 211 carries an electromagnet 240 whose pole-piece 240a is, in the unenergised state of the magnet (as shown), located a short distance below a disc 71 of magnetic material which is rigidly mounted concentrically with the spindle 10, on the frame 23 of the apparatus. The bush 70 also carries a rigid rest bar 72 located below the lower end of the arm 211 in which is mounted a stop screw 73 for adjusting the air gap between the pole-piece 240a and the disc 71.

On the opposite side of the bush 70 from the arm 211 is pivoted a lever 74 which carries a downwardly directed electromagnet 219 whose pole-piece 218a is spaced by a suitable air gap from the surface of the friction disc 44 driven by the flowmeter 1. This disc is of a magnetic material. A second rigid bar 75 is secured to the bush 70 above the pivot of the lever 74 and carries near its free end an adjustable abutment screw 76. A tension spring 77 connected between the lever 74 and the bar 75 normally holds the lever in contact with the abutment screw 76, adjustment of which controls the air gap between the pole-piece 218a and the friction disc 44.

The windings of the electromagnets 218 and 240 are connected to sliprings 78, 79, 80 carried on the spindle 10. The brushes which engage the rings 78, 80 are connected to the positive main through the normally open relay contacts $A_2$ and $B_1$ respectively, so that the electromagnets 218 and 240 are energised at the same times in the cycle of events as the magnets 118 and 140 of Fig. 2. When either magnet is energised, it is drawn by its own M. M. F. towards the respective discs 44, 71 as the case may be, and when its pole piece 218a or 240a makes contact therewith, a powerful clutch action is set up. It will, therefore, be seen that, on closure of the contacts 38 in the timing device (not shown in Fig. 4, but identical with that shown at 6 in Fig. 1) the magnet 218 is moved downwards on its pivoted lever 74 against the return spring 77 to clutch the bush 70 to the meter-driven disc 44. The bush, and with it the arm 211, are thus rotated for the predetermined time as fixed by the spacing between the contacts 38 and 39 around the periphery of the cam disc 36 in the timing device. When the contacts 39 are closed, the electromagnet 218 is de-energised and the magnet 240 is energised to clutch the bush 70 to the fixed disc 71, thus preventing further rotation of the arm 211. The latter is at the same time swung about its pivot to bring the master contact 2 into engagement with the annular follow-up slave contacts 12, 13 whereupon the same follow-up procedure ensues as that described with reference to Figs. 1, 2 or 3. The indicator 5 thus registers the mean fluid flow over the successive predetermined periods of time.

In the construction of apparatus shown in Fig. 5, the flowmeter spindle 3 carries at its free upper end a shallow contrate wheel 81, the edge of which is serrated to present a large number of V-shaped notches. Mounted directly above this wheel and coaxial with it is an exactly similar wheel 82 which is fixed to the frame 23. A rigid double-knife-edged blade 83 is attached to a rotatable coaxial spindle 10 which has a limited freedom of axial movement in bearings in the frame 23 of the apparatus. The upper end of the rotatable spindle carries a radial arm 11 at the end of which is mounted an insulated spring plunger type master contact 202 which is engageable with an annular slave contact 212. This contact is interrupted at two diametrically opposite points 212a, and its two halves are connected, through collecting brushes 32 and 33 to relays C/4 and D/4 respectively. The inner end of the radial arm 11 is bifurcated at 11a, the inward facing surfaces of the limbs of the fork each carrying a hemispherical nib 84 arranged coaxially with the spindle 10 and embracing with slight clearance the flattened end 48a of a common armature lever 48 associated with the oppositely acting electromagnets 118 and 140. The armature 48 is biased by a single spring 53 in the sense for lifting the spindle 10. The upper surface of the upper limb of the fork 11a carries a similar hemispherical nib 85 which is insulated from the arm 11 and is connected to the master contact 202. A resilient contact blade 134 secured at one end to the frame 23 bears on the nib 85 with sufficient pressure to balance the upward thrust on the spindle 10 from the biasing spring 53 so that the spindle normally assumes a position in which the knife-edged blade 83 lies mid-way between the opposed contrate wheels 81, 82.

The rotatable spindle 10 also carries an elongated pinion 61 which is engageable with a horizontal rack 62 mounted on the end of a solenoid plunger 63. The solenoid is energised through normally closed contacts $A_3$, $B_3$, $C_3$ and $D_3$ to return the spindle 10 to its zero position. The spindle is normally held in such an axial position that the knife-edged blade 83 is in the middle of the gap between the rotating and fixed wheels 81, 82 by the balance set up between the spring 53 and the spring contact 134.

When the contacts 38 are closed by the timing device 6, the relay A/3 is operated and breaks the circuit to the solenoid 64 by opening contacts $A_3$. Simultaneously magnet 118 is energised through contacts $A_2$ and this magnet attracts the armature lever 48, thus moving the shaft 10 downwards so that the knife-edged blade 83 engages with the contrate wheel 81 driven by the flowmeter 1.

The relay A/3 is held energised by hold-on contacts $A_1$ and normally closed contacts $B_2$. When the second pair of contacts 39 on the timing device 6 are operated, relay B/5 is energised thus operating contacts $B_1$, $B_2$, $B_3$, $B_4$ and $B_5$. The operation of contacts $B_2$ breaks the hold-on circuit for relay A/3, and contacts $B_1$ energise magnet 140 so that the blade 83 is raised quickly from engagement with the contrate wheel 81 to engagement with the fixed wheel 82, and thus the arm 11 is locked in the position to which it was moved by the meter 1 during the timing period. Simultaneously, the master contact 202 engages with the one or other half of the interrupted annular slave contact 212, and thus connects the positive main through relay contacts $B_1$, spring contact 134, contacts 85 and 202, annular contact 212 and the corresponding collecting brush 32 or 33 to the appropriate relay C/4 or D/4. Operation of the relay contacts $B_3$ serves to hold open the circuit of the solenoid 64, although the relay contacts $A_3$ are now closed. Energisation of either of the relays C/4 or D/4, which is dependent on the portion of the annular slave contact 212 with which the master contact 202 happens to be engaged, closes the appropriate pairs of contacts $C_1$, $C_4$ or $D_1$, $D_4$, and opens the corresponding pairs of contacts $C_2$, $C_3$ or $D_2$, $D_3$. The contacts $C_1$, $D_1$, prepare the circuit for energisation of the follow-up motor 42 in the appropriate direction, but the circuit is at the moment broken by the operation of contacts $B_4$. Contacts $C_2$, $D_2$ open one branch of the circuit to the synchronous motor 35 of the timing device 6, but the motor remains energised for the moment by the operation of relay contacts $B_5$. Contacts $C_3$ and $D_3$ also break the circuit to the solenoid 64, whilst the contacts $C_4$ and $D_4$, which are in parallel with the contacts $B_1$, energise a hold-on circuit for the relays C/4 and D/4 and also magnet 140. As soon as the timing device has opened its contacts 39, the relay B/5 is released, opening contacts $B_1$ and $B_5$ and closing contacts $B_2$, $B_3$ and $B_4$. The opening of contacts $B_1$ has no effect on the circuit since either contacts $C_4$ or $D_4$ are holding the circuit in operation; the closing of contacts $B_2$ has no effect, since the circuit remains broken at the contacts $A_1$; the closing of contacts $B_3$ also has no effect since the circuit is broken by relay contacts $C_3$ or $D_3$. The closing of the contacts $B_4$, however, completes the circuit to the follow-up motor 42 which then rotates the follow-up slave contact assembly 214 in the appropriate direction and the opening of contacts $B_5$ breaks the circuit to the synchronous motor 35, thus preventing the reclosing of contacts 38.

Rotation of the slave contact assembly 214 varies the setting of the potentiometer 31 and hence the reading of the instrument 5.

When the break 212a in the interrupted annular slave contact 212 is brought into coincidence with the master contact 202, the circuit to the relay C/4 or D/4 is broken and the relay is released thus opening contacts $C_1$, $C_4$ or $D_1$, $D_4$ and closing contacts $C_2$, $C_3$, or $D_2$, $D_3$. Thus the follow-up motor 42 is stopped and the timing device 6 is restarted, the magnet 140 is de-energised allowing the spindle 10 and blade 83 to resume their normal mid-positions and completing the circuit to the solenoid 64, thus rotating the spindle until it reaches its zero position with the arm 11 resting against the zero stop 22. Thus the whole cycle is complete and will be repeated when the contacts 38 in the timing device 6 are reclosed.

In large installations or in cases where high accuracy is required, it may be advantageous to provide duplicate master and annular slave contact assemblies which are alternately rendered operative so that one assembly is effecting the control or indicating operation whilst the other is being moved during the measuring operation. As will be understood, more than two such assemblies may be used if desired and operated in sequence.

In any of the above described embodiments, the frictional brake elements may be replaced by electromagnets carried on the moving parts which are engageable with coacting magnetic clutch members, the electromagnets being suitably energized or de-energised to effect the corresponding clutching or de-clutching operations.

In all the above described embodiments of the invention, it will be seen that the accuracy of the measurement or control of the rate of flow of fluid is limited by two factors, viz: the accuracy of the volumetric meter 1 and the error introduced by the follow-up system. The latter can be made as small as the particular circumstances require so that the overall accuracy of the apparatus can be made to approach that of a volumetric flowmeter as nearly as desired. Furthermore, the load imposed on the volumetric flowmeter 1 is never greater than the frictional drag of the arm 11, 111 or 211 as the case may be, and this can be kept to a minimum by careful design. Errors due to fluctuations in load on the meter 1 are thus reduced to a minimum, whilst the follow-up arrangement permits ample power to be available for any control operation.

What I claim is:

1. Mechanism responsive to the rate of flow of fluid comprising a volumetric flow responsive device, an element connected to the flow responsive device and movable in accordance with the volumetric flow of the fluid, a master member which is engageable with said movable element to be driven thereby and is disengageable therefrom, a stationary member to be engaged by the master member to retain it stationary when disengaged from the movable element, means to cause connection of the master member alternately with the movable element and the stationary member, a timing mechanism for controlling the connection of the master member with the movable element at the commencement of the predetermined time period and disconnecting the same at the end of the predetermined time period and connecting said master member to the stationary member, a follow-up member and means controlled by said master member and said follow-up member to move the follow-up member to assume a complementary position to the master member after the lapse of a predetermined time period, indicating means actuated by said means for moving the follow-up member, and said timing mechanism controlling the means to move the follow-up member.

2. Mechanism responsive to the rate of flow of fluid comprising a volumetric flow responsive device, an element connected to the flow responsive device and movable in accordance with the volumetric flow of the fluid, a master member which is engageable with said movable element to be driven thereby and is disengageable therefrom, a contact carried by the master member, a stationary member to be engaged by the master member to retain it stationary when disengaged from the movable element, means to cause connection of the master member alternately with the movable element and the stationary member, a timing mechanism for controlling the connection of the master member with the movable element at the commencement of a predetermined time period and disconnecting the same at the end of the predetermined time period and connecting it to the stationary member, and a follow-up member and means to move the follow-up member to assume a complementary position in relation to the master member after the lapse of a predetermined time period, indicating means actuated by said means for moving the follow-up member, a contact carried by the follow-up member, an electrical circuit including the two contacts to effect operation of the means to move the follow-up member, and said timing mechanism controlling the flow of current through said circuit including the two contacts to effect the operation of said means to move the follow-up member.

3. Mechanism as claimed in claim 2 wherein the contact carried by the follow-up member comprises two parts insulated from each other and engageable alternatively with the contact carried by the master member, and wherein said electrical circuit includes an electrical connection between each said contact part and the means to move the follow-up member to operate the latter in the appropriate direction.

4. Mechanism as claimed in claim 2 wherein the circuit including the contacts includes a relay having its energising winding connected to a source of electric current through the master and follow-up contacts.

5. Mechanism as claimed in claim 2 wherein the means to cause connection of the master member with the movable element and the stationary member comprises a member driven by the movable element of the volumetric flow responsive device, the stationary member is spaced from the driven member and clutch means is provided for alternatively clutching the master member to the movable element and the fixed member.

6. Mechanism as claimed in claim 2 wherein the movable element is rotatable about a fixed axis and the stationary member is spaced axially therefrom, and the means to cause connection of the master member with the movable element comprises a member connected with the master member and freely rotatable about the fixed axis and slidably located between the stationary member and the movable element to alternately connect the stationary member and the movable element together.

7. Mechanism responsive to the rate of flow of a fluid comprising a volumetric flow responsive device, an element connected to the flow responsive device and movable in accordance with the volumetric flow of the fluid, a master member, a releasable mechanical driving connection between the movable element and the master member, means for retaining the master member stationary when released from the movable element, timing mechanism connected with said driving connection for controlling the driving connection of the master member to the element at the commencement of a predetermined time period and disconnecting the same at the end of the predetermined time period, said timing mechanism comprising a constant speed motor, alternative electric circuits including means therein for effecting the connection of the master member with the movable element and the retaining means, a rotatable cam driven by said motor and two sets of cooperating contacts spaced around the axis of rotation of the cam and engageable successively thereby to control the alternative electric circuits, and a follow-up member and means controlled by said master member and said follow-up member to move the follow-up member to assume a complementary position in relation to the master member after the lapse of a predetermined time period, indicating means actuated by said means for moving the follow-up member, and said timing mechanism controlling the means to move the follow-up member.

8. Mechanism responsive to the rate of flow of a fluid comprising a volumetric flow responsive device, a serrated wheel connected to the flow responsive device and movable in accordance with the volumetric flow of the fluid, a master member, a knife edged blade connected thereto, means to produce relative movement of the serrated wheel and the blade to cause engagement and disengagement thereof, fixed means engageable by said knife edged blade for retaining said knife edged blade and master member stationary when released from the serrated wheel, timing mechanism connected with the means to produce relative movement for controlling the connection of the knife edged blade to the serrated wheel at the commencement of the predetermined time period and disconnecting same at the end of the predetermined time, a follow-up member and means controlled by said master member and said follow-up member to move the follow-up member to assume a complementary position in relation to the master member after the lapse of a predetermined time period, indicating means actuated by said means to move the follow-up member, and said timing mechanism controlling the means to move the follow-up mechanism.

9. Mechanism responsive to the rate of flow of a fluid comprising a volumetric flow responsive device, an element connected to the flow responsive device and movable in accordance with the volumetric flow of the fluid, a master member movable toward and from said movable element, and adapted to be driven by said movable element when moved toward the movable element, releasable mechanical connecting means between the movable element and the master member, means for retaining the master member stationary when released from the movable element, a follow-up member, means controlled by said master member and said follow-up member for moving said follow-up member to assume a complementary position in relation to the master member after the lapse of a predetermined time period, said releasable mechanical connecting means between the movable element and the master member including a pair of electro-magnets, means for moving said master member toward and from said movable element including an armature pivoted to move toward one electro-magnet when it is energized and in the opposite direction when the other electro-magnet is energized, said master member being engageable by said armature in its movements caused by energization of said electro-magnets to cause the master member to move toward and from said movable element, indicating means actuated by said means for moving said follow-up member, and timing mechanism connected with the releasable mechanical connecting means for controlling the energization of one electro-magnet at the commencement of a time period and the energization of the other electro-magnet at the end of the time period to cause movement of the master member toward and from said movable element, and for controlling the means to move the follow-up member.

10. Mechanism responsive to the rate of flow of fluid comprising a volumetric flow responsive device, an element connected to the flow responsive device and movable in accordance with the volumetric flow of the fluid, a master member, a master member carrier which is engageable with said movable element to drive the master member and is disengageable therefrom, a contact carried by the master member, a stationary member to be engaged by the master member carrier to retain the master member stationary when the master member carrier is disengaged from the movable element, means to cause connection of the master member carrier alternately with the movable element and the stationary member, said means comprising a movable armature, said armature being engageable with the master member and the master member carrier, electro-magnets located relative to said armature and operative to move the armature in opposite directions, a timing mechanism for controlling the alternate energizing of said electro-magnets to connect the master member carrier with the movable element at the commencement of a predetermined time period and disconnecting the same at the end of the predetermined time period and connecting it to the stationary member, and a follow-up member and means to move the follow-up member to assume a complementary position in relation to the master member after the lapse of a predetermined time period, indicating means actuated by said means for moving the follow-up member, a contact carried by the follow-up member, an electrical circuit including the two contacts to effect operation of the means to move the follow-up member, and said timing mechanism controlling the flow of current through said circuit including the two contacts to effect the operation of said means to move the follow-up member.

References Cited in the file of this patent

UNITED STATES PATENTS

| | | |
|---|---|---|
| 2,020,847 | Mitereff | Nov. 12, 1935 |
| 2,203,789 | Johnson | June 11, 1940 |
| 2,385,772 | Borden | Oct. 2, 1945 |
| 2,394,297 | Fayles | Feb. 5, 1946 |
| 2,552,454 | Pitcher et al. | May 8, 1951 |

FOREIGN PATENTS

| | | |
|---|---|---|
| 375,186 | Germany | May 8, 1923 |